United States Patent
Maki et al.

(10) Patent No.: US 7,001,937 B2
(45) Date of Patent: Feb. 21, 2006

(54) PROCESS FOR PRODUCING COLORED RESIN COMPOSITION AND UTILIZATION THEREOF

(75) Inventors: Hitoshi Maki, Tokyo (JP); Masayasu Kawamura, Tokyo (JP); Masashi Koide, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 389 days.

(21) Appl. No.: 10/240,831

(22) PCT Filed: Feb. 14, 2002

(86) PCT No.: PCT/JP02/01224

§ 371 (c)(1),
(2), (4) Date: Oct. 7, 2002

(87) PCT Pub. No.: WO02/064669

PCT Pub. Date: Aug. 22, 2002

(65) Prior Publication Data

US 2003/0100633 A1 May 29, 2003

(30) Foreign Application Priority Data

Feb. 16, 2001 (JP) .............................. 2001-039374

(51) Int. Cl.
*C08J 3/22* (2006.01)
*C08J 3/215* (2006.01)
*C08K 5/06* (2006.01)

(52) U.S. Cl. ...................... 523/333; 523/340; 523/351; 524/378; 524/385

(58) Field of Classification Search .............. 523/333, 523/340, 351; 524/378, 385
See application file for complete search history.

(56) References Cited

U.S. PATENT DOCUMENTS

| 3,360,497 A | * | 12/1967 | Jones et al. | 524/106 |
| 3,755,244 A | | 8/1973 | Hart | 260/41 |
| 5,736,465 A | * | 4/1998 | Stahl et al. | 442/59 |
| 5,872,164 A | | 2/1999 | Koide et al. | |
| 6,566,432 B1 | * | 5/2003 | Kawamura et al. | 524/376 |
| 2002/0013397 A1 | | 1/2002 | Kawamura et al. | 524/376 |

FOREIGN PATENT DOCUMENTS

| GB | 1589508 | | 5/1981 |
| JP | 61-126139 | | 6/1986 |
| JP | 7-53772 | | 2/1995 |
| JP | 411001578 A | * | 1/1999 |
| JP | 11-106573 | | 4/1999 |
| JP | 2000010241 A | * | 1/2000 |
| JP | 2000226477 A | * | 8/2000 |
| JP | 2000290513 A | * | 10/2000 |
| WO | 01/44387 | | 6/2001 |

* cited by examiner

Primary Examiner—Tae H. Yoon
(74) Attorney, Agent, or Firm—Wenderoth, Lind & Ponack, L.L.P.

(57) ABSTRACT

A process for the production of a colored resin composition, comprising a step (A) of producing an aqueous slurry of a pigment, a step (B) of producing a melting composition of metallocene type polyolefin containing a dispersant and a solvent, a step (C) of kneading the aqueous slurry obtained in the step (A) with the melting composition obtained in the step (B) and a step (D) of removing the solvent and the water from the kneaded mixture obtained in the step (C), a colored composition obtained in the above process has excellent in pigment dispersibility and high color developing properties, a colored resin molded article obtained from the colored resin composition do not give a physical-properties inhibition of 5% or higher and has a color developing properties.

4 Claims, No Drawings

PROCESS FOR PRODUCING COLORED RESIN COMPOSITION AND UTILIZATION THEREOF

BACKGROUND OF THE INVENTION

1. Field of the Invention

The present invention relates to a process for the production of a colored resin composition used for coloring a thermoplastic resin and a colored resin composition thereof. Further, the present invention relates to a colored resin molded article, a coating composition and a pigment resin composition for recording information which are obtained from a colored resin composition obtained according to the production process of the present invention.

2. Prior Arts of the Invention

Conventionally, there is used a powdery dry color obtained by mixing a pigment with a dispersant which is solid at room temperature, a liquid color or paste color obtained by dispersing a pigment in a dispersant which is liquid at room temperature, a pellet-like, flake-like or bead-like colored pellet (sometimes also called a colored compound) obtained by dispersing a pigment in a resin which is solid at room temperature or a master batch as a colored resin composition used for coloring a molded article of a thermoplastic resin or for producing a colored resin molded article. The master batch has a common feature with the colored pellet in that these are obtained by dispersing a pigment in a resin which is solid at room temperature. However, there is a difference between the master batch and the colored pellet. The colored pellet itself is directly molded without being diluted with a resin for dilution or a resin for a molded material (that is, the concentration of a pigment is adjusted to the concentration of a molded material as an end product). In contrast, since the master batch contains a pigment in a higher concentration in comparison with the colored pellet, the master batch is diluted with an appropriate thermoplastic resin (a resin for dilution or a resin to be colored) before the molding. From this respect, the master batch and the colored pellet are different from each other.

These colored resin compositions are properly selected and used in consideration of their features depending upon an intended use. Among these colored resin compositions, the master batch is preferably used in view of easiness of handling and protection of a work environment when used. The required performances of the master batch are that the master batch has a high concentration of a pigment and that the influence exerted upon various physical properties of a thermoplastic resin to be colored, such as heat resistance or strength, is small. As a precision-improvement and a speed-up in the molding of a polyolefin resin advance, in addition to these requirements, the high dispersibility of a pigment has come to be required as compared with before.

As a dispersant for imparting a pigment dispersibility to the master batch, there are generally used stearic acid; metallic soaps such as zinc stearate, magnesium stearate, aluminum stearate and calcium stearate; ethylenebisamide; hydrocarbon waxes such as polyethylene wax and polypropylene wax; and derivatives of these such as waxes formed of an acid-modified material or a hydroxyl-group-modified material.

However, when the production of a molded article requires a high-degree pigment dispersion, e.g., a high-speed spinning at a diameter of ten-odd microns or a film molding is carried out, the use of the above dispersant can not give a sufficient dispersion effect.

Thus, in JP-A-7-53772 publication, the compound of the following chemical formula is used as a dispersant for a colored resin composition,

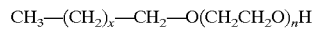

wherein x is 28 to 48 (average) and n is 1 to 16. While the use of this dispersant has given a finer result as compared with a conventional product, a thread breakage while spinning, the clogging of a filter of a melt-spinning machine and blobbing on a film surface still occur because of a poor pigment dispersion in some cases. When a molded article further needs to have higher mechanical and physical strength even if a high-speed spinning or a film molding is possible, it is impossible to impart a practically sufficient strength to the molded article in some cases.

In recent years, a high-degree dispersion of a pigment or an incorporation of a functional material in a master batch is increasingly required so that a variety of studies are made. As one solution, the use of water increases. That is, it is a method using water as a dispersion assistant, in which a pigment or a dispersant and a thermoplastic resin are mixed in the presence of water and then the water is removed to obtain a colored resin composition. This technology can be widely applied and it can be broadly divided by the amount of used water. For example, there are disclosed a method described in JP-A-6-143253, JP-A-6-148937 and JP-A-7-233275 in which a small amount of water is added as a dispersion assistant, a method described in JP-A-51-50952, JP-A-57-186758, JP-A-59-1538, JP-A-61-126139, JP-A-62-161861, JP-A-2-175770, JP-A-2-227469, JP-A-5-341569, JP-A-9-204069 and JP-A-10-279877 in which water is contained as an aqueous cake of a pigment, a method described in JP-A-7-247367 and JP-A-8-302092 in which a dispersant or a dispersion resin is converted into a water-soluble dispersant or a water-soluble dispersion resin and the water-soluble dispersant or the water-soluble dispersion resin is used as a water dispersion, and a method described in JP-A-63-43960, JP-A-10-10799 and JP-A-2000-17083 in which a pigment is used as a solution of a water dispersion. However, the method adding water in a small amount or the method using a paste requires a kneading machine having a strong shearing force similar to a kneading machine required when a dry pigment is used. In addition to this defect, these methods do not accomplish a great performance improvement in dispersibility although the necessity for removing the added water is added. On the other hand, the method using a water dispersion containing a large amount of water does not require a kneading machine having a strong shearing force. However, the above method can be practically applied only when a specific resin is used. Therefore, a produced colored resin composition is poor in general versatility under the present situation.

SUMMARY OF THE INVENTION

It is an object of the present invention to provide (1) a process for the production of a colored resin composition which has high pigment dispersibility and high color developing properties and, when used as a master batch, of which the mechanical and physical properties such as tensile strength, modulus of elasticity in flexureand impact strength do not give a physical-properties-inhibition of 5% or higher to each strength value of a natural resin to be colored.

It is another object of the present invention to provide (2) a colored resin composition which has high pigment dispersibility and high color developing properties and, when used as a master batch, of which the mechanical and physical properties such as tensile strength, modulus of elasticity and impact strength do not give a physical-properties-inhibition of 5% or higher to each strength value of a natural resin to be colored.

It is further another object of the present invention to provide (3) a colored resin molded article having excellent mechanical properties and obtained by the use of the colored resin composition of the present invention, a coating composition showing excellent coating composition suitability and obtained by the use of the colored resin composition of the present invention and a pigment resin composition for recording information which has high recording suitability and is obtained by the use of the colored resin composition of the present invention.

According to the present invention, there is provided a process for the production of a colored resin composition, comprising a step (A) of producing an aqueous slurry of a pigment, a step (B) of producing a melting composition of metallocene type polyolefin containing a dispersant and a solvent, a step (C) of kneading the aqueous slurry obtained in the step (A) with the melting composition obtained in the step (B) and a step (D) of removing the solvent and the water from the kneaded mixture obtained in the step (C).

According to the present invention, further, there is provided a process according to the above, wherein a dispersant is incorporated in the step (A).

According to the present invention, further, there is provided a process according to the above, wherein the dispersant is a compound of the formula (1), $$C_nH_{2N+1}(OCH_2CH_2)_mOH \qquad (1)$$

wherein n is an integer of 1 to 100 and m is an integer of 1 to 100.

According to the present invention, further, there is provided a colored resin composition obtained according to the process recited above.

According to the present invention, further, there is provided a colored resin composition according to the above, which has a granular form.

According to the present invention, further, there is provided a flushing method of a pigment, comprising kneading an aqueous slurry of a pigment and a solvent-containing melting composition of metallocene type polyolefin in the presence of a dispersant.

DETAILED DESCRIPTION OF THE INVENTION

The term "metallocene type polyolefin" in the present specification is a generic term for polyolefins obtained by using a metallocene compound as a polymerization catalyst. The characteristic feature of this polymer is that the polymer is a high-molecular weight polymer having a high-degree narrow molecular weight distribution (for example, in the case of metallocene type polyethylene, Mw/Mn<2) in comparison with the molecular weight distribution of a polymer obtained by using a conventional Ziegler catalyst or a conventional Ziegler-natta catalyst. The obtained polymer has a low crystallinity and is noncrystalline and the density and melting point thereof are significantly lower than those of a general-purpose polyolefin obtained from the same monomer by polymerization in the presence of a non-metallocene catalyst.

The present inventors have found that a large amount of a pigment can be incorporated and remarkably homogeneously dispersed in a colored resin composition by using the above-specified polymer and a dispersant and that as a result a molded article having excellent mechanical strength can be obtained without causing any problems such as a breakage of a film due to a poor dispersion of a pigment. Further, since the pigment dispersibility is good, a colored resin material which is also excellent in color developing properties can be obtained.

According to the findings of the present inventors, a pigment is converted into a water-based mixture (dispersion) and a thermoplastic resin as a base and a dispersant are added while swelling with an appropriate solvent and while melting under heat, the resultant mixture is kneaded, and a phase transition occurs in the water in which the pigment and the thermoplastic resin finely-milled due to shearing at the kneading time are dispersed, to cause a flushing, whereby the thermoplastic resin and the dispersant which have been swelled with the solvent cover the dispersed pigment as a core. This flushing prevents the reagglomeration of the pigment so that there can be obtained a resin composition excellent in pigment dispersibility. Further, the present inventors have found that, when the above flushing from the aqueous phase to the resin phase is carried out at a temperature near to the boiling point of water over a long time, the dispersibility of the pigment increases. From this finding, the present inventors have found an advantage that such a flushing at a temperature near to the boiling point of water can be easily and effectively carried out by using a metallocene type polyolefin having a melting point lower than that of a general-purpose conventional polyolefin.

Further, since the metallocene type polyolefin has features in that it has high compatibility with various resins, the colored resin composition of the present invention has, as a master batch, general versatility with various resins to be colored. Therefore, the scope of application thereof is broad, and a molded article excellent in mechanical and physical properties can be obtained when the colored resin composition of the present invention is uniformly mixed with a resin to be colored.

The colored resin molded article according to the present invention is characterized in that it is formed of the colored resin composition of the present invention. Since the colored resin composition of the present invention is excellent in pigment dispersibility and excellent in color developing performance, there can be produced a colored resin molded article having excellent mechanical strength and high color developing properties by using the colored resin composition of the present invention.

The colored resin composition according to the present invention is preferably used for a colored resin molded article, as a master batch or a colored pellet. In addition, the colored resin composition according to the present invention can be used for an ink, a coating composition, an adhesive, a toner for recording information and the like.

The embodiment of the present invention will be explained in detail hereinafter.

The term "metallocene type polyolefin" in the present specification is a generic term for polyolefins obtained by using a metallocene compound as a polymerization catalyst, and a metallocene type polyethylene and a metallocene type polypropylene can be preferably used. More preferably, it is preferred to use a metallocene type polyethylene having a melting point of from 50° C. to 120° C. or a metallocene type polyethylene having a density of from 0.70 g/cm³ to 0.91 g/cm³.

In another preferred embodiment of the present invention, there is selected a polymer having a melt flow rate (MFR) in the range of from 0.1 to 400, more preferably from 5 to 250. When the MFR is less than 0.1, the compatibility of the polymer with a resin to be colored is poor, which may cause an adverse effect on the various physical properties of a molded article in some cases, e.g., irregular color of a molded article is caused in some cases. On the other hand, when the MFR exceeds 400, it is difficult to produce a colored resin composition and at the same time the various physical properties of a molded article such as strength may be adversely affected in some cases. The above MFR in the present invention refers to a MFR measured according to JIS-K7210.

The metallocene type polyolefin has a characteristic feature in that it has high compatibility with a resin to be colored. Concretely, while a master batch of a general-purpose polyethylene can not be mixed with polypropylene (resin to be colored), a master batch of a metallocene type polyethylene can be mixed with polypropylene.

The term "metallocene compound" used as a polymerization catalyst is a generic term for compounds in which at least one ligand having a cyclopentadienyl skeleton is coordinated to a tetravalent transition metal such as titanium, zirconium, nickel, palladium, hafnium, niobium or platinum.

The ligand having a cyclopentadienyl skeleton includes alkyl-substituted cyclopentadienyl groups such as a cyclopentadienyl group, a methylcyclopentadienyl group, an ethylcyclopentadienyl group, a n- or i-propylcyclopentadienyl group, a n-, i-, sec- or tert-butylcyclopentadienyl group, a hexylcyclopentadienyl group and an octylcyclopentadienyl group; alkyl-substituted cyclopentadienyl groups such as dimethylcyclopentadienyl group, a methylethylcyclopentadienyl group, a methylpropylcyclopentadienyl group, a methylbutylcyclopentadienyl group, a methylhexylcyclopentadienyl group, an ethylbutylcyclopentadienyl group and an ethylhexylcyclopentadienyl group; multiple-alkyl-substituted cyclopentadienyl groups such as trimethylcyclopentadienyl group, a tetramethylcyclopentadienyl group and a pentamethylcyclopentadienyl group; cycloalkyl-substituted cyclopentadienyl groups such as a methylcyclohexyl cyclopentadienyl group; an indenyl group, a 4, 5, 6, 7-tetrahydroindenyl group and a fluorenyl group.

Examples of ligands other than the ligand having a cyclopentadienyl skeleton include a monovalent anion ligand such as chlorine and bromine, a bivalent anion chelate ligand, a hydrocarbon group, alkoxide, amide, arylamide, aryloxide, phosphide, arylphosphide, a silyl group and a substituted silyl group. The above hydrocarbon group includes hydrocarbon groups having approximately 1 to 12 carbon atoms and example thereof includes alkyl groups such as a methyl group, an ethyl group, a propyl group, a butyl group, an isobutyl group, an amyl group, an isoamyl group, a hexyl group, a septyl group, an octyl group, a nonyl group, a decyl group and 2-ethylhexyl group; cycloalkyl groups such as a cyclohexyl group and a cyclopentyl group; aryl groups such as a phenyl group and a tolyl group; aralkyl groups such as a benzyl group and a neophyl group; and a nonylphenyl group.

The metallocene compound in which a ligand having a cyclopentadienyl skeleton is coordinated concretely includes cyclopentadienyltitanium-tris-dimethylamide, methylcyclopentadienyltitanium-tris-dimethylamide, bis (cyclopentadienyl)titanium dichloride, dimethylsilyltetramethylcyclopentadienyl-tert-butylamidezirconium dichloride, dimethylsilyltetramethylcyclopentadienyl-p-n-butylphenylamidezirconium dichloride, methylphenylsilyltetramethylcyclopentadienyl-tert-butylamidehafnium dichloride, dimethylsilyltetramethylcyclopentadienyl-tert-butylamidehafnium dichloride, indenyltitanium-tris-dimethylamide, indenyltitanium-tris-diethylamide, indenyltitanium-bis-di-n-butylamide and indenyltitanium-bis(di-n-propylamide).

The above metallocene compounds can be used as a catalyst system additionally containing, for example, methylaminoxane or a boron compound as a cocatalyst. In this case, the molar ratio of the above cocatalyst based the metallocene compound is preferably 1~1,000,000.

The polyolefin includes polyethylene, polypropylene, a copolymer (random or block copolymer) of ethylene and propylene, and a copolymer of ethylene or propylene and α-olefin (excluding ethylene or propylene). Further, the polyolefin may be oligomers of these by pyrolysis. The above α-olefin includes 1-butene, 1-pentene, 1-hexene, 1-heptene, 1-octene, 4-methyl-1-pentene, 1-decene, 1-dodecene, 1-tetradecene, 1-hexadecene and 1-octadecene. Among these α-olefins, 1-butene, 1-hexene and 1-octene are preferred as an α-olefin used for a copolymerization with ethylene, and 1-butene and 1-hexene are preferred as an α-olefin used for a copolymerization with propylene.

The dispersant used in the present invention is not specially limited in structure so long as it is a surface-active substance having a pigment dispersion power. For example, the dispersant can be widely selected from nonionic, cationic, anionic and amphoteric substances which are generally called surfactants. When the nonionic surfactant is used, a dispersant of the formula (1) is particularly preferred, $$C_nH_{2N+1}(OCH_2CH_2)_mOH \qquad (1)$$

wherein n is an integer of 1 to 100 and m is an integer of 1 to 100.

The anionic surfactant includes fatty acid derivative (R—COONa or K or NH$_4$) type anionic surfactants such as a fatty acid soap, a rosin acid soap, a naphthenic acid soap and a fatty acid sarcosido; sulfuric acid ester (ROSO3Na, K, NH$_4$ or alkanolamine salt) type anionic surfactants such as a long-chain or secondary alcohol sulfate, olefin sulfate, fatty acid ethylene glycolide sulfate, polyoxyethylene alkylphenyl ether sulfate, polyoxyethylene alkyl ether sulfate, fatty acid mono or polyhydric alcohol sulfate, fatty acid alkyl sulfate, fatty acid amide sulfate and fatty acid anilide sulfate; sulfonic acid ester type anionic surfactants such as alkanesulfonate, petroleum sulfonate, α-olefin sulfonate, α-sulfofatty acid salt, sulfoethanol fatty acid ester salt, alkyl sulfoacetate, alkyl sulfosuccinate, fatty acid amide sulfonate, sulfosuccinic acid mono alkylamide, polyoxyethylene isooctylphenyl ether sulfonate, lower alkyl naphthalene sulfonate, dinaphthyl methane sulfonate, alkylbenzene sulfonate and alkyl diphenyl ether disulfonate, and phosphoric acid ester type anionic surfactants such as alkyl phosphate and polyoxyethylene alkylphenyl ether phosphate.

The cationic surfactant includes quaternary ammonium salt (N—R4) type cationic surfactants such as amine-derivative type cationic surfactants or heterocyclic amine type cationic surfactants.

The nonionic surfactant includes polyoxyethylene type surfactants, including the formula (1), such as polyoxyethylene alkyl ether, polyoxyethylene alkylphenyl ether, polyoxyethylene alkylnaphthyl ether, polyoxyethylene alkyl thioether, polyoxyethylene alkylamide, polyoxyethylene-polyoxypropylene glycol and polyoxyethylene fatty acid ester and polyhydric alcohol surfactants such as ethylene glycol fatty acid ester, propylene glycol fatty acid ester, sorbitan fatty acid ester, fatty acid ethanol amide, acetylene fatty acid ester and acetylene diol.

The amphoteric surfactant includes an alkylbetaine type surfactant, alkylamino propionate, alkyl diglycine hydrochloride, and alkyl taurine salt.

The dispersant of the formula (1) used in the present invention is a compound obtained by the incorporation of an ethoxy group into a long-chain alcohol, and the present invention clarifies that it functions as a surfactant. That is, the present invention clarifies that the dispersant of the formula (1) has an effect that the dispersant of the formula (1) as a nonionic surfactant improves the compatibility of a pigment surface with a metallocene type polyolefin.

In the formula (1), when n exceeds 100, undesirably, a pigment dispersion effect is liable to decrease and the melting point of the dispersant increases so that processability becomes poor when a resin having a low melting weight is used as a resin to be colored. When m exceeds 100, undesirably, the heat at the time of processing the colored resin composition may cause a decomposition foaming in some cases. In the preferred embodiment, the above n is 26 to 50 and the above m is 4 to 100. Further, the melting point of the above dispersant is preferably 60 to 120° C. When the melting point is lower than 60° C., a material (a mixture of the colored resin composition of the present invention and an adequate resin for dilution or for structure formation is generically called "material") may slip on a screw of an extruder and prevent a biting at the time of an extrusion suing the colored resin composition of the present invention in some cases. When it exceeds 120° C., the rapid dispersion of the dispersant in a resin to be colored may become difficult in some cases. Further, when the dispersant is not melted at a flushing temperature, even a pigment dispersion effect is not sufficiently produced. The melting point in the present invention refers to the peak temperature of a melting point measured with a differential scanning calorimetry-measuring apparatus under a nitrogen gas current at a temperature-increasing rate of 10° C./min.

As the pigment, there can be used at least one of known organic pigments and inorganic pigments which have been used for a printing ink or a coating composition or for coloring a thermoplastic resin. No special limitation shall be imposed upon the pigment.

The organic pigment includes azo pigments such as azo lake pigments, Hansa pigments, Benzimidazolone pigments, Diarylide pigments, Pyrazolone pigments, Benzidine yellow pigments and Disazo pigments; fused polycyclic pigments such as Phthalocyanine pigments, Quinacridone pigments, Perylene pigments, Perinone pigments, Dioxazine pigments, Anthraquinone pigments and Isoindolinone pigments; and Aniline black.

The inorganic pigment includes inorganic pigments such as Titanium Oxide, Titanium yellow, Iron oxide, Ultramarine, Cobalt blue, Chromium oxide green, Chrome yellow, Cadmium yellow and Cadmium red; and Carbon black pigments.

These pigments are used in the form of any one of a dry pigment, apigment wet cake containing water before drying or a mixture of these.

The colored resin composition according to the present invention contains at least the above dispersant, the above pigment and the above metallocene type polyolefin. The colored resin composition of the present invention can be used as a master batch which contains a pigment in a high concentration and is to be diluted with a resin to be colored when molded or as a colored pellet which has a relatively low pigment concentration and is directly molded as it is without dilution with a resin to be colored. The mixing ratio of respective components in the composition is not specially limited and can be properly selected according to an intended use or the like as required.

For example, when the colored resin composition of the present invention is used as a colored pellet, the content of the pigment in the colored resin composition is preferably 0.01 to 40% by weight. When the content of the pigment is smaller than the lower limit of the above range, undesirably, physical properties such as tinting strength and hue are insufficient. When it exceeds the upper limit of the above range, undesirably, a defective appearance such as blobbing may be caused due to a pigment agglomeration at the time of molding of a molded article in some cases. When the above colored resin composition is used as a master batch, the content of the pigment in the colored resin composition is preferably 0.01 to 90% by weight, particularly preferably 20 to 80% by weight. When the content of the pigment is smaller than the lower limit of the above range, a large amount of the colored resin composition must be used for obtaining an intended hue or intended tinting strength, which is economically undesirable and, in addition, may cause an adverse effect upon mechanical and physical properties in some cases. When the content of the pigment exceeds the upper limit of the above range, it is difficult to produce the colored resin composition itself and an adverse effect in pigment dispersibility may be caused in some cases.

The amount ratio of the dispersant based on the metallocene type polyolefin is 0.01 to 120% by weight. Preferably, the amount ratio of the dispersant based on the metallocene type polyolefin is 0.1 to 45% by weight. When it is smaller than the lower limit of the above range, it is difficult to obtain an intended hue or tinting strength. When it exceeds the upper limit of the above range, mechanical and physical properties may be adversely affected in some cases.

The colored resin composition can additionally contain a variety of additives such as wax, an antioxidant, an ultraviolet absorber or a surfactant in such a range that the effect of the present invention is not prevented, as required.

The production of the colored resin composition can be divided into the following four steps of (A) to (D). The production of the colored resin composition will be explained separately for the steps of (A) to (D). First, the step (A) comprises precedently dispersing a pigment into water in a proper amount. In the step (A), the dispersion of the pigment is preferably stabilized with a dispersant, preferably an anionic or nonionic dispersant, particularly preferably the dispersant of the formula (1). And, the step (B) of preparing a resin melting solution comprises adding an organic solvent which can decrease a softening viscosity mainly at the softening point of a metallocene type polyolefin or a higher temperature to a mixture containing a dispersant, preferably the dispersant of the formula (1), the metallocene type polyolefin and optionally a variety of additives such as wax an antioxidant and an ultraviolet absorber and heating the resultant mixture up to at least the softening point of the metallocene type polyolefin to melt the mixture. The step (A) and the step (B) are separately carried out at the same time. Then, the step (C) comprises adding the resin melting solution prepared in the step (B) to the pigment slurry prepared in the step (A), stirring the mixture of the pigment slurry and the resin melting solution with a stirring device which rotates at a high speed to flush the pigment. Further, the step (D) comprises removing the added solvent and the water from the mixture after the flushing. A better pigment dispersion can be obtained by carrying out a series of the above operations.

As the water used when a pigment is precedently dispersed, tap water, distilled water, ion-exchanged water, hard water, soft water or the like may be used without any special limitations. Preferred is water which does not contain a component (a floating body of coarse particle, dissolved material, ions and etc.) which exerts an influence upon the usage of the colored resin composition.

In this case, the amount of the pigment based on the water in the aqueous mixture is preferably 0.5 to 50% by weight. Further, the amount of the dispersant, which is added as required, based on the water is preferably 0.1 to 50% by weight. The amount of the dispersant based on the pigment is preferably 0.5 to 50% by weight. The above mixture containing a dispersant, a pigment and water is preferably a mixture obtained by adding an aqueous solution of a dispersant or an aqueous dispersion of a dispersant to an aqueous dispersion of a pigment from the viewpoint of the following reason. The use of an aqueous medium of a dispersant (mixture of dispersant and water; a generic name for an aqueous solution of a dispersant when the dispersant is water-soluble, an aqueous dispersion of a dispersant when the dispersant is insoluble in water or a combination of these) advances the dispersion of a pigment more effectively in comparison with the direct addition of a dispersant. As a result, the thus-obtained colored resin composition comes to be suited for a spinning or the production of a film which requires the high dispersion of a pigment and the mechanical and physical properties of a molded article become better.

Further, in the present invention, the organic solvent which can decrease a softening viscosity mainly at the softening point of a metallocene type polyolefin or higher is not specially limited in structure. The organic solvent can be selected regardless of the presence or absence of a resin solubility or regardless of polarity so long as it is an organic solvent which can decrease a viscosity by being added when the metallocene type polyolefin is melted by heating (that is, the addition thereof increases a MFR value). From the viewpoint of handling, preferred is an organic solvent which is easily removed from the water after the flushing by some methods. The organic solvent may be water-soluble or water-insoluble. For example, the organic solvent can be broadly selected from naphthenic hydrocarbon, paraffinic hydrocarbon, olefinic hydrocarbon, aromatic hydrocarbon, halogenated hydrocarbon, ethers, ketones, alcohols, aldehydes, phenols, esters, fatty acid, carboxylic acids, etc., and these organic solvents may be used alone or in combination.

While the amount of the selected organic solvent based on the metallocene type polyolefin depends on the MFR value of a resin to be used, it is in the range of 400% by weight or lower. It is preferably 15 to 300% by weight. When it exceeds 400% by weight, the amount of the added solvent itself flushes a pigment dispersed in water and therefore it becomes impossible to cover the pigment with the resin component.

The heating temperature used when a resin type solution in which a mixture is dissolved is prepared by heating the metallocene type polyolefin of the present invention mainly depends upon the kind of metallocene type polyolefin to be used and further depends upon the temperature of an aqueous solution system in which a pigment is dissolved. That is, it is preferred to select a combination of temperature settings which is higher than the temperature of a pigment aqueous solution for preventing the added metallocene type polyolefin from solidifying during the execution of flushing.

In the present invention, the device for performing the step (C) of flushing a pigment by kneading the pigment aqueous dispersion slurry of the step (A) and the resin solution of the step (B) can be selected from a general stirring type mixer, an attritor, a ball mill, a steel mill, a high speed mixer, a homo mixer and a sand mill. The design and the operation condition of each device are not specially limited.

The removal of a solvent content after the execution of a predetermined flushing is preferably carried out by heating under a normal pressure or a reduced pressure with mildly stirring. Further, the removal of a water content after the removal of the solvent content may be carried out at a high temperature after the completion of the solvent removal or it maybe carried out after cooling the temperature by some methods. The water content removal can be carried out by a method such as filtration, centrifugal separation or decantation. Otherwise, there can be adopted a method in which the water content is removed and then the solvent content is removed or a method in which the water content and the solvent content are removed at the same time.

The colored resin composition of the present invention from which the water content and the solvent content have been removed can be directly used as an aqueous paste, and it can be also used in the form of a dried product having a particle diameter of approximately 0.1 mm to 1.0 cm obtained by drying.

For the drying, while a drying method in which the colored resin composition of the present invention is exposed to an extremely high temperature for a long time is not preferred, the colored resin composition of the present invention can be dried by any drying methods such as a tray type drying method, a spray type drying method, a hot-air type drying method, a fluidization type drying method or a vibration type drying method. The design and the operation condition of each device are not specially limited.

Further, a colored resin composition in a pellet form can be produced by charging the aqueous paste or dried product of the colored resin composition of the present invention into an extruder, a roll mill or the like, then mixing it under heat, then removing a remaining water content under normal pressure or a reduced pressure and extruding it. In this case, the mixing under heat is required to be carried out at at least a temperature at which the thermoplastic resin and the dispersant melt. For increasing the dispersibility of the pigment, it is preferred to carry out the mixing under heat at a temperature near to the boiling point of water. Further, for improving the efficiency of dehydration, it is preferred to connect a vacuum pump to an extruder and carry out a dehydration treatment under heat under a reduced pressure as required. When the dried product of the colored resin composition of the present invention is charged in an extruder, a roll mill or the like and then mixed under heat, the colored resin composition in a pellet form can be produced without the use of the vacuum pump for dehydration.

The colored resin composition obtained according to the present invention is broadly used for coloring a synthetic fiber or a plastic film and for a colored resin molded article such as a plastic molded article, a pigment resin composition for recording information such as a toner recording liquid for copying machine or an ink for an inkjet printer, a gravure ink composition and a coating composition, and it is used as a remarkably useful colorant.

The colored resin composition of the present invention can be incorporated into a thermoplastic resin such as polymethylpentene, an AS (acrylonitrile-styrene) resin, an ABS(acrylonitrile-butadiene-styrene) resin, an AES (acrylonitrile-EPDM-styrene) resin, a methacrylate resin, acrylic polyamide, an EVOH (ethylene vinyl alcohol) resin, polycarbonate, a polyester resin, polybutylene terephthalate, polyacetal, polyvinyl chloride, polyvinylidene chloride, polyphenylene oxide, polyphenylene sulfide, polyarylate, polyallylsulfone, a fluororesin, a liquid crystal polymer and polystyrene type, polyolefin type and polyurethane type thermoplastic elastomers, in addition to a polyolefin resin. The colored resin composition of the present invention can give colored rein molded articles having excellent mechanical strength, heat resistance and color mixture stability, such as a synthetic fiber, a plastic film or a plastic molded article.

Although the molding method is not specially limited, an extrusion molding and an injection molding are preferred. As a resin to be colored, which is mixed with a master batch at a molding time, a resin (polyolefin resin, etc.) having high compatibility with a thermoplastic resin used in the colored resin composition is preferred, and the resin to be colored can be selected at will. For the purpose of improving physical properties, the colored resin composition of the present invention can be mixed with a resin to be colored which contains a reinforcement such as an inorganic filler or a glass fiber.

When the colored resin composition of the present invention is extrusion-molded, particularly when extrusion-molded for a thin material such as a film, a film having excellent pigment dispersibility and an excellent surface state with no drawn lines, etc., can be effectively obtained. Further, when the colored resin composition of the present invention is injection-molded, a molded article having excellent pigment dispersibility and having no irregular color and no flow mark can be obtained.

Further, a toner recording liquid for a copying machine which has excellent tinting strength, image formability, weather resistance and heat resistance can be obtained, when the colored resin composition of the present invention is kneaded as it is and then pulverized and classified or when an adequate resin, an adequate wax, an adequate solvent, an adequate charge conditioner, an adequate antifriction agent and the like are properly added to the colored resin composition of the present invention before the kneading and the mixture is kneaded, then pulverized and classified. The above resin includes thermoplastic resins such as polymethylpentene, an AS (acrylonitrile-styrene) resin, an ABS(acrylonitrile-butadiene-styrene) resin, an AES (acrylonitrile-EPDM-styrene) resin, a methacrylate resin, acrylic polyamide, an EVOH (ethylene vinyl alcohol) resin, polycarbonate, a polyester resin, polybutylene terephthalate, polyacetal, polyvinyl chloride, polyvinylidene chloride, polyphenylene oxide, polyphenylene sulfide, polyarylate, polyallylsulfone, a fluororesin, a liquid crystal polymer and polystyrene type, polyolefin type and polyurethane type thermoplastic elastomers in addition to a polyolefin resin.

Further, when the colored resin composition of the present invention is melted and kneaded with a natural or synthetic wax, a higher alcohol surfactant, an organic solvent, etc., and a small amount of a thermoplastic resin, there can be obtained an ink for an inkjet printer which ink has excellent tinting strength, weather resistance and heat resistance.

Further, when the colored resin composition of the present invention is melted and kneaded with a higher alcohol surfactant, an organic solvent, a resin for vehicle and etc., there can be obtained a gravure ink composition or a coating composition which has excellent tinting strength, color mixture stability, weather resistance and heat resistance.

EXAMPLES

The present invention will be explained more in detail with reference to Examples hereinafter, while the present invention shall not be limited to these Examples so long as the technical principles of the present invention is secured. Further, "part" and "%" respectively stand for "part by weight" and "% by weight" hereinafter.

1. Production of a Colored Resin Composition

Example 1

12 parts of an aqueous dispersion containing 25% of a dispersant of the formula (1) which had a melting point of 105° C., m=30 and n=10, and 300 parts of a phthalocyanine blue pigment "Lionol Blue FG-7330" (supplied by Toyo Ink Mfg Co., Ltd.) in the form of an aqueous presscake having a solid content of 48.5% were poured in 5,200 part of water in a 20-liters container made of stainless steel, and the mixture was dispersed under heat with a high-speed mixer at 3,000 rpm for 30 minutes to obtain a pigment slurry having 70° C. On the other hand, 294 parts of a metallocene type polyethylene resin (supplied by Nippon polychem, melting point: 58° C., MFR: 50, density: 0.880 g/cm$^3$), 12 parts of an aqueous dispersion containing 25% of a dispersant of the formula (1) which had a melting point of 105° C., m=30 and n=10, and 180 parts of "Exxsol DSP 100/140, supplied by Exxson were added to a 2-liters container made of stainless steel, and the mixture was heated up to 80° C. with stirring to melt the resins completely. The whole amount of the thus-obtained resin solution was added to the above pigment slurry at a stroke. The resultant mixture was stirred with the high-speed mixer for 10 minutes while maintaining the number of rotations of the high-speed mixer. According to this operation, the pigment dispersed in the water was flushed and transferred into a resin solvent system to become a granular having a diameter of 0.3 to 4 mm, and the granular floated in the water. Under the above state, the solvent was distilled off from the system with a paddle type stirring machine for 40 minutes while maintaining 80° C. Then, the resultant mixture was cooled down to 40° C. or lower and filtrated to remove the water. The produced aqueous wet cake was dried with a fluidized bed dryer at 60° C. for 30 minutes, whereby a pearl-like colored resin composition (present invention Composition 1) was obtained.

Example 2

A bead-like colored resin composition (present invention Composition 2) was obtained in the same manner as in Example 1 except that 180 parts of the "Exxsol DSP 100/140" supplied by Exxson was replaced with 180 parts of xylene for industrial use.

Example 3

A bead-like colored resin composition (present invention Composition 3) was obtained in the same manner as in Example 1 except that 180 parts of the "Exxsol DSP 100/140" supplied by Exxson was replaced with 180 parts of "AF solvent AF-4" supplied by NIPPON PETROCHEMICALS CO.,LTD.

Example 4

A bead-like colored resin composition (present invention Composition 4) was obtained in the same manner as in Example 1 except that 180 parts of the "Exxsol DSP 100/140" supplied by Exxson was replaced with 180 parts of "Isopar C" supplied by Exxson.

Example 5

A bead-like colored resin composition (present invention Composition 5) was obtained in the same manner as in Example 1 except that 180 parts of the "Exxsol DSP 100/140" supplied by Exxson was replaced with 180 parts of n-hexane.

Example 6

A bead-like colored resin composition (present invention Composition 6) was obtained in the same manner as in Example 1 except that 180 parts of the "Exxsol DSP 100/140" supplied by Exxson was replaced with 180 parts of methylcyclohexane.

Example 7

A bead-like colored resin composition (present invention Composition 7) was obtained in the same manner as in Example 1 except that 180 parts of the "Exxsol DSP 100/140" supplied by Exxson was replaced with 180 parts of methylethyl ketone.

Example 8

A bead-like colored resin composition (present invention Composition 8) was obtained in the same manner as in Example 1 except that 180 parts of the "Exxsol DSP 100/140" supplied by Exxson was replaced with 180 parts of ethyl acetate.

Example 9

A bead-like colored resin composition (present invention Composition 9) was obtained in the same manner as in Example 1 except that 180 parts of the "Exxsol DSP 100/140" supplied by Exxson was replaced with 180 parts of isobutanol.

Example 10

A bead-like colored resin composition (present invention Composition 10) was obtained in the same manner as in Example 1 except that the amount of the "Exxsol DSP 100/140" supplied by Exxson was changed from 180 parts to 50 parts.

Example 11

A bead-like colored resin composition (present invention Composition 11) was obtained in the same manner as in Example 1 except that the amount of the "Exxsol DSP 100/140" supplied by Exxson was changed from 180 parts to 500 parts.

Comparative Example 1

A ball-like colored resin composition (Comparative Composition 1) was obtained in the same manner as in Example 1 except that 180 parts of the "Exxsol DSP 100/140" supplied by Exxson was not used.

Example 12

A bead-like colored resin composition (present invention Composition 12) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a metallocene type polyethylene resin (supplied by Nippon Evolue, melting point: 105° C., MFR: 4, density: 0.915 g/cm$^3$)

Example 13

A bead-like colored resin composition (present invention Composition 13) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a pyrolytic substance (supplied by Nippon Evolue, melting point: 106° C., MFR: 135, density: 0.896 g/cm$^3$) of the same metallocene type polyethylene resin as that used in Example 12.

Example 14

A bead-like colored resin composition (present invention Composition 14) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a metallocene type polyethylene resin (supplied by Dow Chemical Japan, Ltd., melting point: 60° C., MFR: 2, density: 0.880 g/cm$^3$)

Example 15

A bead-like colored resin composition (present invention Composition 15) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a metallocene type polyethylene resin (supplied by Mitsui Chemicals, Inc., melting point: 48° C., MFR: 6, density: 0.890 g/cm$^3$).

Example 16

A bead-like colored resin composition (present invention Composition 16) was obtained in the same manner as in Example 1 except that the amount of the metallocene type polyethylene resin (supplied by Nippon Polychem, melting point: 58° C., MFR: 50, density: 0.880 g/cm$^3$) was changed from 294 parts to 444 parts.

Example 17

A bead-like colored resin composition (present invention Composition 17) was obtained in the same manner as in Example 1 except that the amount of the metallocene type polyethylene resin (supplied by Nippon Polychem, melting point: 58° C., MFR: 50, density: 0.880 g/cm$^3$) was changed from 294 parts to 194 parts.

Example 18

A bead-like colored resin composition (present invention Composition 18) was obtained in the same manner as in Example 1 except that the amount of the metallocene type polyethylene resin (supplied by Nippon Polychem, melting point: 58° C., MFR: 50, density: 0.880 g/cm$^3$) was changed from 294 parts to 155.5 parts.

Comparative Example 2

An oval briquette-like colored resin composition (Comparative Composition 2) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a linear low-density polyethylene resin (supplied by TOSOH CORPORATION, melting point: 126° C., MFR: 8.5, density: 0.915 g/cm$^3$)

Comparative Example 3

A red bean-like colored resin composition (Comparative Composition 3) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a low-density polyethylene resin (supplied by Mitsui Chemicals, Inc., melting point: 107° C., MFR: 7, density: 0.917 g/cm$^3$)

Comparative Example 4

An oval briquette-like colored resin composition (Comparative Composition 4) was obtained in the same manner as in Example 1 except that 294 parts of the metallocene type polyethylene resin (supplied by Nippon Polychem, melting point: 58° C., MFR: 50, density: 0.880 g/cm$^3$) was replaced with 294 parts of a pyrolytic resin (melting point: 115° C., MFR: 160, density: 0.888 g/cm$^3$) of a propylene/α-olefin copolymer supplied by Mitsui Chemicals, Inc.

Example 19

A bead-like colored resin composition (present invention Composition 19) was obtained in the same manner as in Example 1 except that 12 parts of each aqueous dispersion containing 25% of the dispersant of the formula (1) which had a melting point of 105° C., N=30 and m=10 was replaced with 20 parts of an aqueous dispersion containing 15% of a dispersant of the formula (1) which had a melting point of 78° C., n=20 and m=10.

Example 20

A bead-like colored resin composition (present invention Composition 20) was obtained in the same manner as in Example 1 except that 12 parts of each aqueous dispersion containing 25% of the dispersant of the formula (1) which had a melting point of 105° C., N=30 and m=10 was replaced with 12 parts of an aqueous dispersion containing 25% of a dispersant of the formula (1) which had a melting point of 91° C., n=25 and m=7.

Example 21

A bead-like colored resin composition (present invention Composition 21) was obtained in the same manner as in Example 1 except that the amount of each aqueous dispersion containing 25% of the dispersant of the formula (1) which had a melting point of 105° C., N=30 and m=10 was changed from 12 parts to 6 parts and that the amount of the metallocene type polyethylene resin (supplied by Nippon Polychem, melting point: 58° C., MFR: 50, density: 0.880 g/cm$^3$) was changed from 294 parts to 298.5 parts.

Example 22

A bead-like colored resin composition (present invention Composition 22) was obtained in the same manner as in Example 1 except that the amount of each aqueous dispersion containing 25% of the dispersant of the formula (1) which had a melting point of 105° C., N=30 and m=10 was changed from 12 parts to 180 parts and that the amount of the metallocene type polyethylene resin (supplied by Nippon Polychem, melting point: 58° C., MFR: 50, density: 0.880 g/cm$^3$) was changed from 294 parts to 275 parts.

Comparative Example 5

An oval briquette-like colored resin composition (Comparative Composition 5) was obtained in the same manner as in Example 1 except that the aqueous dispersions containing 25% of the dispersant of the formula (1) which had a melting point of 105° C., N=30 and m=10 were not used.

Example 23

A bead-like colored resin composition (present invention Composition 23) was obtained in the same manner as in Example 1 except that 300 parts of the phthalocyanine blue pigment "Lionol Blue FG-7330" (supplied by Toyo Ink Mfg Co., Ltd.) in the form of an aqueous presscake having a solid content of 48.5% was replaced with 300 parts of a quinacridone red pigment "Lionogen Red 5700" (supplied by Toyo Ink Mfg Co., Ltd.) in the form of an aqueous presscake having a solid content of 30.5%.

Example 24

A bead-like colored resin composition (present invention Composition 24) was obtained in the same manner as in Example 1 except that 300 parts of the phthalocyanine blue pigment "Lionol Blue FG-7330" (supplied by Toyo Ink Mfg Co., Ltd.) in the form of an aqueous presscake having a solid content of 48.5% was replaced with 300 parts of a quinacridone magenta pigment "Lionogen magenta 5790" (supplied by Toyo Ink Mfg Co., Ltd.) in the form of an aqueous presscake having a solid content of 37.5%.

Example 25

A bead-like colored resin composition (present invention Composition 25) was obtained in the same manner as in Example 1 except that 300 parts of the phthalocyanine blue pigment "Lionol Blue FG-7330" (supplied by Toyo Ink Mfg Co., Ltd.) in the form of an aqueous presscake having a solid content of 48.5% was replaced with 300 parts of a phthalocyanine green pigment "Lionol Grenn 8120" (supplied by Toyo Ink Mfg Co., Ltd.) in the form of an aqueous presscake having a solid content of 48.8%.

Example 26

A bead-like colored resin composition (present invention Composition 26) was obtained in the same manner as in Example 1 except that 300 parts of the phthalocyanine blue pigment "Lionol Blue FG-7330" (supplied by Toyo Ink Mfg Co., Ltd.) in the form of an aqueous presscake having a solid content of 48.5% was replaced with 360 parts of a titanium white pigment "TIPAQUE CR-90" (supplied by ISHIHARA SANGYO KAISHA, LTD.) in the form of an aqueous presscake having a solid content of 75.0%.

Example 27

A bead-like colored resin composition (present invention Composition 27) was obtained in the same manner as in Example 1 except that 300 parts of the phthalocyanine blue pigment "Lionol Blue FG-7330" (supplied by Toyo Ink Mfg Co., Ltd.) in the form of an aqueous presscake having a solid content of 48.5% was replaced with 300 parts of a carbon black pigment "MA-10" (supplied by MITSUBISHI CHEMICAL CORPORATION) in the form of an aqueous presscake having a solid content of 31.5%.

Example 28

A bead-like colored resin composition (present invention Composition 28) was obtained in the same manner as in Example 1 except that 300 parts of the phthalocyanine blue pigment "Lionol Blue FG-7330" (supplied by Toyo Ink Mfg Co., Ltd.) in the form of an aqueous presscake having a solid content of 48.5% was replaced with 300 parts of an isoindolinone yellow pigment "IRGAZIN YELLOW 3RLT-N" (supplied by Ciba Specialty chemicals) in the form of an aqueous presscake having a solid content of 24.2%.

Example 29

A sand-like colored resin composition (present invention Composition 29) was obtained in the same manner as in Example 1 except that a homomixer was used in place of the high-speed mixer when the slurry of the pigment was prepared and when the high-speed stirring after the addition of the resin solution was carried out.

Example 30

A sand-like colored resin composition (present invention Composition 30) was obtained in the same manner as in Example 1 except that a sand mill was used in place of the high-speed mixer when the slurry of the pigment was prepared and when the high-speed stirring after the addition of the resin solution was carried out.

Example 31

An aqueous paste of a colored resin composition before drying prepared in the same manner as in Example 1 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 31) without causing any strand breaks or pulsation.

Example 32

An aqueous paste of a colored resin composition before drying prepared in the same manner as in Example 5 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 32) without causing any strand breaks or pulsation.

Comparative Example 6

An aqueous paste of a colored resin composition before drying prepared in the same manner as in Comparative Example 1 was melted and kneaded with an extruder having a screw diameter of 30 mm under heat at a setting temperature of 140° C. and the kneaded colored resin composition was pelletized while removing a water content with a vacuum pump, to successfully obtain a master batch (Comparative Composition 6) without causing any strand breaks or pulsation.

Example 33

An aqueous paste of a colored resin composition before drying prepared in the same manner as in Example 13 was melted and kneaded with an extruder having a screw diameter of 30 mm under heat at a setting temperature of 140° C. and the kneaded colored resin composition was pelletized while removing a water content with a vacuum pump, to successfully obtain a master batch (present invention Composition 33) without causing any strand breaks or pulsation.

Comparative Example 7

An aqueous paste of a colored resin composition before drying prepared in the same manner as in Comparative Example 2 was melted and kneaded with an extruder having a screw diameter of 30 mm under heat at a setting temperature of 140° C. and the kneaded colored resin composition was pelletized while removing a water content with a vacuum pump, to successfully obtain a master batch (Comparative Composition 7) without causing any strand breaks or pulsation.

Example 34

An aqueous paste of a colored resin composition before drying prepared in the same manner as in Example 16 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 34) without causing any strand breaks or pulsation.

Example 35

An aqueous paste of a colored resin composition before drying prepared in the same manner as in Example 17 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 35) without causing any strand breaks or pulsation.

Example 36

An aqueous paste of a colored resin composition before drying prepared in the same manner as in Example 20 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 36) without causing any strand breaks or pulsation.

Example 37

An aqueous paste of a colored resin composition before drying prepared in the same manner as in Example 21 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 37) without causing any strand breaks or pulsation.

Comparative Example 8

An aqueous paste of a colored resin composition before drying prepared in the same manner as in Comparative Example 5 was melted and kneaded with an extruder having a screw diameter of 30 mm under heat at a setting temperature of 140° C. and the kneaded colored resin composition was pelletized while removing a water content with a vacuum pump, to successfully obtain a master batch (Comparative Composition 8) without causing any strand breaks or pulsation.

Example 38

An aqueous paste of a colored resin composition before drying prepared in the same manner as in Example 23 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 38) without causing any strand breaks or pulsation.

Example 39

An aqueous paste of a colored resin composition before drying prepared in the same manner as in Example 26 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 39) without causing any strand breaks or pulsation.

Example 40

An aqueous paste of a colored resin composition before drying prepared in the same manner as in Example 29 was melted and kneaded with an extruder having a screw diameter of 30 mm under heat at a setting temperature of 90° C. and the kneaded colored resin composition was pelletized while removing a water content with a vacuum pump, to successfully obtain a master batch (present invention Composition 40) without causing any strand breaks or pulsation.

Example 41

The present invention composition 1 obtained in Example 1 was pelletized while it was melted and kneaded with an extruder having a screw diameter of 30 mm under heat at a setting temperature of 130° C., to successfully obtain a master batch (present invention Composition 41) without causing any strand breaks or pulsation.

Example 42

The present invention composition 16 obtained in Example 16 was pelletized while it was melted and kneaded with an extruder having a screw diameter of 30 mm under heat at a setting temperature of 130° C., to successfully obtain a master batch (present invention Composition 42) without causing any strand breaks or pulsation.

Example 43

The present invention composition 20 obtained in Example 20 was pelletized while it was melted and kneaded with an extruder having a screw diameter of 30 mm under heat at a setting temperature of 130° C., to successfully obtain a master batch (present invention Composition 43) without causing any strand breaks or pulsation.

Example 44

The present invention composition 23 obtained in Example 23 was pelletized while it was melted and kneaded with an extruder having a screw diameter of 30 mm under heat at a setting temperature of 130° C., to successfully obtain a master batch (present invention Composition 44) without causing any strand breaks or pulsation.

Example 45

The present invention composition 26 obtained in Example 26 was pelletized while it was melted and kneaded with an extruder having a screw diameter of 30 mm under heat at a setting temperature of 130° C., to successfully obtain a master batch (present invention Composition 45) without causing any strand breaks or pulsation.

[Productions of Conventional Type Master Batches]

Comparative Example 9

Two components of a phthalocyanine blue pigment "Lionol Blue FG-7330" (supplied by Toyo Ink Mfg Co., Ltd.) in an amount of 300 parts and a polyethylene wax "NL500" (supplied by Mitsui Chemicals, Inc.) in an amount of 300 parts were kneaded with a three-roll mill to obtain a mill base. 1,250 parts of a low-density polyethylene resin "MIRASON 11P" (supplied by Mitsui Chemicals, Inc.) was added to 500 parts of the above-obtained mill base, and the mixture was pelletized with an extruder having a screw diameter of 30 mm, to obtain a conventional type master batch (Comparative Composition 9).

Comparative Example 10

A conventional type master batch (Comparative Composition 10) was obtained in the same manner as in Comparative Example 9 except that 300 parts of the phthalocyanine blue pigment "Lionol Blue FG-7330" (supplied by Toyo Ink Mfg Co., Ltd.) was replaced with 300 parts of a quinacridone red pigment "Lionogen Red 5700" (supplied by Toyo Ink Mfg Co., Ltd.).

Comparative Example 11

A conventional type master batch (Comparative Composition 11) was obtained in the same manner as in Comparative Example 9 except that 300 parts of the phthalocyanine blue pigment "Lionol Blue FG-7330" (supplied by Toyo Ink Mfg Co., Ltd.) was replaced with 300 parts of a quinacridone magenta pigment "Lionogen magenta 5790" (supplied by Toyo Ink Mfg Co., Ltd.).

Comparative Example 12

A conventional type master batch (Comparative Composition 12) was obtained in the same manner as in Comparative Example 9 except that 300 parts of the phthalocyanine blue pigment "Lionol Blue FG-7330" (supplied by Toyo Ink Mfg Co., Ltd.) was replaced with 300 parts of a phthalocyanine green pigment "Lionol Grenn 8120" (supplied by Toyo Ink Mfg Co., Ltd.).

Comparative Example 13

A conventional type master batch (Comparative Composition 13) was obtained in the same manner as in Comparative Example 9 except that 300 parts of the phthalocyanine blue pigment "Lionol Blue FG-7330" (supplied by Toyo Ink Mfg Co., Ltd.) was replaced with 360 parts of a titanium white pigment "TIPAQUE CR-90" (supplied by ISHIHARA SANGYO KAISHA, LTD.).

Comparative Example 14

A conventional type master batch (Comparative Composition 14) was obtained in the same manner as in Comparative Example 9 except that 300 parts of the phthalocyanine blue pigment "Lionol Blue FG-7330" (supplied by Toyo Ink Mfg Co., Ltd.) was replaced with 300 parts of a carbon black pigment "MA-10" (supplied by MITSUBISHI CHEMICAL CORPORATION).

Comparative Example 15

A conventional type master batch (Comparative Composition 15) was obtained in the same manner as in Comparative Example 9 except that 300 parts of the phthalocyanine blue pigment "Lionol Blue FG-7330" (supplied by Toyo Ink Mfg Co., Ltd.) was replaced with 300 parts of an isoindolinone yellow pigment "IRGAZIN YELLOW 3RLT-N" (supplied by Ciba Specialty chemicals).

2. Evaluation Tests of Colored Resin Compositions

The colored resin compositions obtained in Examples 1 to 45 and Comparative Examples 1 to 15 were subjected to the following evaluation tests. Table 1 and Table 2 show the results. Evaluation methods and evaluation standards will be shown hereinafter.

[Evaluation of a Film Molded Article]

One of the obtained colored resin compositions and polypropylene "F327BV" (supplied by Grand Polymer) as a resin to be colored were mixed so as to have a pigment concentration of 1.5% and the mixture was melted and extruded with a T-die film molding machine (supplied by TOYO SEIKI Co.,Ltd.) at a molding temperature of 250° C. at a screw rotating speed of 50 rpm to obtain a film having a film thickness of 30 $\mu$m. The obtained films were evaluated as follows.

(1) Observation of a Film Void and Evaluation of Strength

A film cross-section was observed through an electron microscope (×3,000). The number of observed voids was shown as an average value of five visual fields. The tensile strength of a film was measured according to JIS K7113 and its retention was determined.

(2) Evaluation of a Film Surface State (the Presence or Absence of Film Breakage, Blobbing and Smoothness were Evaluated by Visual Observation)

⦿: Excellent
○: No problem in practical use
Δ: Problem was found in any one of film breakage, blobbing and smoothness
X: Poor
-: Not evaluated

[Evaluation of Pigment Dispersibility]

The obtained colored resin compositions were evaluated for a pigment dispersion state by the following evaluation tests.

(3) A Pressure Buildup Value at a Tip of an Extruder

When a large amount of an undispersed pigment exists in the colored resin composition, the clogging of a mesh installed in the tip portion of an extruder takes place as the extrusion advances. Each of the obtained colored resin composition in an amount corresponding to 300 g of the pigment content was respectively extruded with a single-screw extruder having a screw diameter of 20 mm and having a 10 $\mu$m-cut wire mesh installed in its tip. A difference (kg/cm$^2$) between the pressure exerted at an initial time of the extrusion and the pressure exerted on the mesh after 300 g of the pigment content was extruded was determined. The present value is concerned with a continuous runnability in a production area, and it is preferably 20 kg/cm$^2$ or less.

(4) The Number of Coarse Particles

The T-die film molded articles obtained in the above (1) and (2) were respectively measured for the number of pigment particles having a particle diameter of from 1 $\mu$m to 50 $\mu$m in each of the films with an image processing device "Luzex 450" (supplied by Toyo Ink Mfg Co., Ltd.), and the following scores were given.

5: $1.0 \times 10^2$ number/cm$^2$ or less
4: more than $1.0 \times 10^2 \sim 7.0 \times 10^2$ number/cm$^2$ or less
3: more than $7.0 \times 10^2 \sim 2.7 \times 10^3$ number/cm$^2$ or less
2: more than $2.7 \times 10^3 \sim 7.0 \times 10^3$ number/cm$^2$ or less
1: more than $7.0 \times 10^3$ number/cm$^2$ The film molded articles ranked 5 and 4 in the above scores can be used with no problem in practical use.

(5) Relative Color Development Intensity of a Hot-pressed Sheet 100 parts of polypropylene "J106" supplied by Grand Polymer, 1.0 part of one of the obtained colored resin composition and 5 parts of titanium oxide "TIPAQUE CR-60" (supplied by ISHIHARA SANGYO KAISHA, LTD.) were mixed, the mixture was kneaded with a two-roll mill, and the kneaded mixture was hot-pressed to obtain a plate having a thickness of 2 mm. The obtained plate was measured for reflection intensity at each wavelength of 430 nm, 540 nm, 620 nm and 640 nm with a spectral colorimetry device "CM-2002" supplied by Minolta Co., Ltd., and the kubelka-Munk function (k/s) (color development intensity) of the plate was determined from the above reflection intensities. All the obtained colored resin compositions were evaluated for a relative color development intensity in the same manner as above. However, concerning the colored resin compositions of titanium oxide obtained in Examples 26, 39 and 45 and Comparative Example 13 and the colored resin compositions of carbon black obtained in Example 27 and Comparative Example 14, the plates obtained therefrom were measured for brightness (ΔL).

(6) Evaluation of Spinnability

One of the obtained colored resin compositions in an amount corresponding to 1.5 parts of the pigment content and 100 parts of a polyprolylene resin "S106L" supplied by Grand Polymer were mixed and the mixture was spun with a vertical test spinning machine "Spinning tester" supplied by FUJI FILTER MFG.CO.,LTD at a hopper bottom temperature of 180° C. and at a kneading part/die part temperature of 230° C. and then the spun fiber was triply drawn to obtain a polypropylene type fiber. Polypropylene type fibers were respectively obtained from the others of the obtained colored resin compositions in the same manner as above. Each fiber was evaluated for spinnability as follows.

○: No problem was found in both spinnability and drawing properties in practical use
  Δ: Problem was found in any one of spinnability and drawing properties
  X: Thread breakage occurred
  -: Not evaluated

[Evaluation with an Injection-molded Article]

The obtained colored resin compositions were evaluated for injection moldability.

(7) Retention of Mechanical and Physical Properties

One of the obtained colored resin compositions in an amount corresponding to 1.5 parts of the pigment content and 100 parts of polyprolylene "J106" supplied by Grand Polymer were mixed and the mixture was injection-molded with an injection molding machine at a back pressure of 1.0 kg/cm² to obtain a test plate. Test plates were respectively obtained from the others of the obtained colored resin compositions in the same manner as above. Each of the test plate was tested concerning three items of tensile strength, flexural modulus of elasticity and Izod impact strength. In each evaluation, the value of a test plate molded from a resin to be colored alone was considered as 100%, and the retention of mechanical and physical properties concerning each test item of each test plate was obtained and evaluated according to the following standard.

○: 96% or higher in all tests
  Δ: from 90% to less than 96% in at least any one of the tests
  X: 90% or lower in at least any one of the tests (8) Distributivity The plates prepared in the above (7) were evaluated for irregular color by visual observation as follows.

○: No irregular color
  Δ: Irregular color was found in some degree
  X: Irregular color was found obviously
  -: Not evaluated <Evaluation Results>

TABLE 1

Evaluation results of Examples

| | (1) Film | | (3) | (4) |
|---|---|---|---|---|
| | Number of voids (average) | Strength retention (%) | (2) Surface state | Pressure buildup rate (kg/cm²) | Maximum particle number |
| Ex. 1 | 0 | 100 | ◎ | 3 | 5 |
| Ex. 2 | 0.8 | 98 | ◎ | 4 | 5 |
| Ex. 3 | 0.7 | 98 | ◎ | 5 | 5 |
| Ex. 4 | 0 | 100 | ◎ | 3 | 5 |
| Ex. 5 | 0 | 100 | ◎ | 3 | 5 |

TABLE 1-continued

| Ex. 6 | 1.4 | 97 | ◎ | 12 | 4 |
| Ex. 7 | 1.2 | 98 | ◎ | 10 | 4 |
| Ex. 8 | 1.8 | 96 | ○ | 14 | 4 |
| Ex. 9 | 0.9 | 98 | ◎ | 8 | 5 |
| Ex. 10 | 0 | 100 | ◎ | 3 | 5 |
| Ex. 11 | 0 | 100 | ◎ | 3 | 5 |
| Ex. 12 | 0.3 | 100 | ◎ | 4 | 5 |
| Ex. 13 | 0 | 100 | ◎ | 3 | 5 |
| Ex. 14 | 0.2 | 100 | ◎ | 3 | 5 |
| Ex. 15 | 0.4 | 100 | ◎ | 4 | 5 |
| Ex. 16 | 0 | 100 | ◎ | 3 | 5 |
| Ex. 17 | 0 | 100 | ◎ | 3 | 5 |
| Ex. 18 | 0.7 | 99 | ◎ | 7 | 5 |
| Ex. 19 | 0 | 100 | ◎ | 3 | 5 |
| Ex. 20 | 0 | 100 | ◎ | 3 | 5 |
| Ex. 21 | 0 | 100 | ◎ | 3 | 5 |
| Ex. 22 | 0 | 100 | ◎ | 3 | 5 |
| Ex. 23 | 0 | 100 | ◎ | 3 | 5 |
| Ex. 24 | 0 | 100 | ◎ | 12 | 4 |
| Ex. 25 | 0 | 100 | ◎ | 3 | 5 |
| Ex. 26 | 0 | 100 | ◎ | 2 | 5 |
| Ex. 27 | 0 | 100 | ◎ | 10 | 5 |
| Ex. 28 | 0 | 100 | ◎ | 5 | 5 |
| Ex. 29 | 0 | 100 | ◎ | 5 | 5 |
| Ex. 30 | 2.4 | 96 | ○ | 18 | 4 |
| Ex. 31 | 0 | 100 | ◎ | 3 | 5 |
| Ex. 32 | 0 | 100 | ◎ | 3 | 5 |
| Ex. 33 | 0 | 100 | ◎ | 3 | 5 |
| Ex. 34 | 0 | 100 | ◎ | 3 | 5 |
| Ex. 35 | 0 | 100 | ◎ | 3 | 5 |
| Ex. 36 | 0 | 100 | ◎ | 3 | 5 |
| Ex. 37 | 0 | 100 | ◎ | 3 | 5 |
| Ex. 38 | 0 | 100 | ◎ | 3 | 5 |
| Ex. 39 | 0 | 100 | ◎ | 3 | 5 |
| Ex. 40 | 0 | 100 | ◎ | 3 | 5 |
| Ex. 41 | 0 | 100 | ◎ | 2 | 5 |
| Ex. 42 | 0 | 100 | ◎ | 2 | 5 |
| Ex. 43 | 0 | 100 | ◎ | 2 | 5 |
| Ex. 44 | 0 | 100 | ◎ | 2 | 5 |
| Ex. 45 | 0 | 100 | ◎ | 2 | 5 |

| | (5) | | | (7) | |
|---|---|---|---|---|---|
| | Color development intensity (%) | Brightness (ΔL) | (6) Spinnability | Mechanical and physical properties retention | (8) Irregular color |
| Ex. 1 | 100 | | ○ | ○ | ○ |
| Ex. 2 | 100 | | ○ | ○ | ○ |
| Ex. 3 | 100 | | ○ | ○ | ○ |
| Ex. 4 | 100 | | ○ | ○ | ○ |
| Ex. 5 | 100 | | ○ | ○ | ○ |
| Ex. 6 | 100 | | ○ | ○ | ○ |
| Ex. 7 | 100 | | ○ | ○ | ○ |
| Ex. 8 | 98 | | ○ | ○ | ○ |
| Ex. 9 | 100 | | ○ | ○ | ○ |
| Ex. 10 | 100 | | ○ | ○ | ○ |
| Ex. 11 | 100 | | ○ | ○ | ○ |
| Ex. 12 | 100 | | ○ | ○ | ○ |
| Ex. 13 | 100 | | ○ | ○ | ○ |
| Ex. 14 | 100 | | ○ | ○ | ○ |
| Ex. 15 | 100 | | ○ | ○ | ○ |
| Ex. 16 | 100 | | ○ | ○ | ○ |
| Ex. 17 | 100 | | ○ | ○ | ○ |
| Ex. 18 | 100 | | ○ | ○ | ○ |
| Ex. 19 | 100 | | ○ | ○ | ○ |
| Ex. 20 | 100 | | ○ | ○ | ○ |
| Ex. 21 | 100 | | ○ | ○ | ○ |
| Ex. 22 | 100 | | ○ | ○ | ○ |
| Ex. 23 | 100 | | ○ | ○ | ○ |
| Ex. 24 | 105 | | ○ | ○ | ○ |
| Ex. 25 | 102 | | ○ | ○ | ○ |
| Ex. 26 | | 0 | ○ | ○ | ○ |
| Ex. 27 | | 0 | ○ | ○ | ○ |
| Ex. 28 | 101 | | ○ | ○ | ○ |
| Ex. 29 | 100 | | ○ | ○ | ○ |
| Ex. 30 | 98 | | ○ | ○ | ○ |
| Ex. 31 | 100 | | ○ | ○ | ○ |

TABLE 1-continued

| | | | | |
|---|---|---|---|---|
| Ex. 32 | 100 | | ○ | ○ | ○ |
| Ex. 33 | 100 | | ○ | ○ | ○ |
| Ex. 34 | 100 | | ○ | ○ | ○ |
| Ex. 35 | 100 | | ○ | ○ | ○ |
| Ex. 36 | 100 | | ○ | ○ | ○ |
| Ex. 37 | 100 | | ○ | ○ | ○ |
| Ex. 38 | 102 | | ○ | ○ | ○ |
| Ex. 39 | | 0 | ○ | ○ | ○ |
| Ex. 40 | 100 | | ○ | ○ | ○ |
| Ex. 41 | 100 | | ○ | ○ | ○ |
| Ex. 42 | 100 | | ○ | ○ | ○ |
| Ex. 43 | 100 | | ○ | ○ | ○ |
| Ex. 44 | 100 | | ○ | ○ | ○ |
| Ex. 45 | | 0 | ○ | ○ | ○ |

Ex. = Example, CEx = Comparative Example

TABLE 2

Evaluation results of Comparative Examples

| | (1) Film | | (2) Surface state | (3) Pressure buildup rate (kg/cm²) | (4) Maximum particle number |
|---|---|---|---|---|---|
| | Number of voids (average) | Strength retention (%) | | | |
| CEx. 1 | 7.2 | 91 | ○ | 33 | 4 |
| CEx. 2 | 13.6 | 90 | Δ | 47 | 2 |
| CEx. 3 | 17.4 | 87 | X | 89 | 1 |
| CEx. 4 | 28.4 | 82 | — | 239 | 1 |
| CEx. 5 | 5.4 | 92 | ○ | 37 | 3 |
| CEx. 6 | 5.9 | 92 | ○ | 27 | 4 |
| CEx. 7 | 10.1 | 92 | ○ | 30 | 3 |
| CEx. 8 | 4.4 | 92 | ○ | 30 | 4 |
| CEx. 9 | 10.4 | 85 | ○ | 15 | 5 |
| CEx. 10 | 11.1 | 82 | Δ | 19 | 5 |
| CEx. 11 | 17.3 | 80 | Δ | 45 | 5 |
| CEx. 12 | 10.3 | 82 | ○ | 7 | 5 |
| CEx. 13 | 9.4 | 88 | ○ | 9 | 5 |
| CEx. 14 | 16.4 | 80 | Δ | 55 | 5 |
| CEx. 15 | 9.9 | 83 | Δ | 16 | 5 |

| | (5) | | (6) Spinnability | (7) Mechanical and physical properties retention | (8) Irregular color |
|---|---|---|---|---|---|
| | Color development intensity (%) | Brightness (ΔL) | | | |
| CEx. 1 | 82 | | Δ | Δ | X |
| CEx. 2 | 80 | | Δ | Δ | X |
| CEx. 3 | 77 | | X | — | — |
| CEx. 4 | 70 | | X | — | — |
| CEx. 5 | 88 | | Δ | ○ | Δ |
| CEx. 6 | 90 | | ○ | ○ | Δ |
| CEx. 7 | 87 | | Δ | Δ | Δ |
| CEx. 8 | 82 | | ○ | ○ | Δ |
| CEx. 9 | 100 | | X | X | ○ |
| CEx. 10 | 100 | | X | X | ○ |
| CEx. 11 | 100 | | X | X | ○ |
| CEx. 12 | 100 | | X | X | ○ |
| CEx. 13 | | 0 | X | X | ○ |
| CEx. 14 | | 0 | X | X | ○ |
| CEx. 15 | 100 | | X | X | ○ |

Ex. = Example, CEx. = Comparative Example

[Evaluation as a Coating Composition]

(9) Tinting Strength of a Coating Composition

One of the colored resin compositions obtained in Examples 1 to 22 and Comparative Examples 1 to 5 in an amount corresponding to 10 parts of a pigment content, 90 parts of a vehicle for a coating composition which had the following mixing ratio, and 300 parts of zirconia beads having a diameter of 2 mm were placed in a 225 ml-pot made of glass, and the mixture was dispersed for 1 hour with a paint conditioner to obtain a coating composition (deep color). Coating compositions were respectively obtained from the others of the obtained colored resin compositions in the same manner as above. Each of the coating compositions was respectively mixed with a white coating composition using titanium dioxide in a pigment: white ratio of 1:5 and the mixture was extended on an art paper to obtain a wet film thickness of 100 μm. The sample of Comparative Example 5 was considered as 100%, and each sample was measured for tinting strength.

(Composition of the vehicle for a coating composition)

| | |
|---|---|
| Alkyd resin varnish (a nonvolatile content of 60%) | 52 parts |
| Melamine resin varnish (a nonvolatile content of 50%) | 23 parts |
| Xylene | 15 parts |

(10) Gloss of Coating Composition

Each illustration of deep color having a wet film thickness of 100 μm on an art paper, prepared in the above (9), was measured for gloss (60-degree gloss).

[Evaluation as a Gravure Ink Composition]

(11) Tinting Strength of Gravure Ink

One of the colored resin compositions obtained in Examples 1 to 22 and Comparative Examples 1 to 5 in an amount corresponding to 10 parts of a pigment content, 90 parts of a vehicle for a gravure ink which had the following mixing ratio, and 300 parts of zirconia beads having a diameter of 2 mm were placed in a 225-ml pot made of glass, and the mixture was dispersed for 1 hour with a paint conditioner to obtain a gravure ink composition. Gravure ink compositions were respectively obtained from the others of the obtained colored resin compositions in the same manner as above. Each of the gravure ink compositions was respectively mixed with a white coating composition using titanium dioxide in a pigment: white ratio of 1:10 and the mixture was extended on an art paper to obtain a wet film thickness of 21 μm. The sample of Comparative Example 5 was considered as 100%, and each sample was measured for tinting strength.

(Composition of the vehicle for a gravure ink)

| | |
|---|---|
| Rosin calcium/rosin zinc resin varnish (a nonvolatile content of 70%) | 80 parts |
| Toluene | 10 parts |

(12) Gloss of Gravure Ink

Each illustration of deep color ink having a wet film thickness of 21 μm on an art paper, prepared in the above (11), was measured for gloss (60-degree gloss).

Table 3 shows the evaluation results of the above coating compositions and gravure inks.

TABLE 3

Evaluation results of coating compositions and gravure ink compositions

|  | Tinting strength of coating composition (9) | Gloss of coating composition (10) | Tinting strength of gravure ink (11) | Gloss of gravure ink (12) |
| --- | --- | --- | --- | --- |
| Ex. 1 | 111 | 88 | 107 | 77 |
| Ex. 2 | 111 | 88 | 107 | 77 |
| Ex. 3 | 110 | 87 | 107 | 77 |
| Ex. 4 | 110 | 87 | 108 | 77 |
| Ex. 5 | 111 | 88 | 107 | 76 |
| Ex. 6 | 110 | 88 | 106 | 78 |
| Ex. 7 | 111 | 87 | 106 | 77 |
| Ex. 8 | 110 | 88 | 106 | 76 |
| Ex. 9 | 109 | 86 | 108 | 75 |
| Ex. 10 | 107 | 84 | 107 | 77 |
| Ex. 11 | 112 | 88 | 112 | 78 |
| Ex. 12 | 108 | 88 | 106 | 77 |
| Ex. 13 | 110 | 85 | 106 | 77 |
| Ex. 14 | 109 | 86 | 105 | 76 |
| Ex. 15 | 109 | 87 | 104 | 76 |
| Ex. 16 | 108 | 85 | 108 | 75 |
| Ex. 17 | 112 | 86 | 107 | 75 |
| Ex. 18 | 111 | 86 | 105 | 74 |
| Ex. 19 | 113 | 88 | 110 | 77 |
| Ex. 20 | 113 | 88 | 110 | 78 |
| Ex. 21 | 104 | 88 | 102 | 73 |
| Ex. 22 | 114 | 87 | 109 | 77 |
| CEx. 1 | 99 | 79 | 100 | 74 |
| CEx. 2 | 96 | 73 | 93 | 72 |
| CEx. 3 | 94 | 72 | 90 | 69 |
| CEx. 4 | 90 | 70 | 88 | 64 |
| CEx. 5 | 100 | 81 | 100 | 75 |

Ex. = Example, CEx. = Comparative Example

[Evaluation as an Ink Composition for an Inkjet Printer]

(13) High-temperature Stability of Ink

One of the colored resin compositions obtained in Examples 1 to 22 and Comparative Examples 1 to 5 in an amount of 10 parts, 70 parts of a higher alcohol type wax and 10 parts of a paraffin wax were melted and kneaded to prepare an ink composition. The ink composition was allowed to stand at 130° C. for 3 days and then evaluated for stability as follows.
  ○: No separation
  Δ: Separated slightly
  X: Separated completely

[Evaluation as a Toner Recording Liquid for Copying Machine]

(14) Toner Fixing Property

One of the colored resin compositions obtained in Examples 1 to 22 and Comparative Examples 1 to 5 in an amount of 10 parts and a nonlinear polyester resin in an amount of 90 parts were mixed with a Henschel mixer, the mixture was melted and kneaded with an extruder, and the kneaded mixture was pulverized and classified to obtain toner particles. The obtained toner particles were measured for a volume average particle diameter with a coalter counter (TA-II) and it was 8.5 μm. 0.6%, based on the toner particles, of hydrophobing-treated anatase-type titanium dioxide fine particles were added to the toner particles to obtain a toner. Toners were obtained from the others of the colored resin compositions in the same manner as above. Each of the obtained toners in an amount of 4 parts was respectively mixed with 96 parts of a carrier obtained by coating ferrite particles having an average particle diameter of 50 μm with silicon to obtain developers, and copying was continuously carried out on 1,000 paper sheets by means of a commercially available digital color copying machine (thermally fixed at 150° C.) with 0.8 mg/cm² of each toner. In this copying, an image fixing property was evaluated. The Evaluation method was as follows.
  ⦿: Almost free from blurs
  ○: Blurs were found in 10 paper sheets or less in 1,000 paper sheets
  Δ: Blurs were found in from 10 to 20 paper sheets in 1,000 paper sheets
  X: Blurs were found in 20 paper sheets or more in 1,000 paper sheets Table 4 shows the evaluation results of the above pigment resin compositions for recording information.

TABLE 4

Evaluation results of pigment resin compositions for recording information

|  | High-temperature stability of inkjet ink (13) | Toner fixing property (14) |  | High-temperature stability of inkjet ink (13) | Toner fixing property (14) |
| --- | --- | --- | --- | --- | --- |
| Ex. 1 | ○ | ⦿ | Ex. 12 | ○ | ⦿ |
| Ex. 2 | ○ | ⦿ | Ex. 13 | ○ | ⦿ |
| Ex. 3 | ○ | ⦿ | Ex. 14 | ○ | ⦿ |
| Ex. 4 | ○ | ⦿ | Ex. 15 | ○ | ⦿ |
| Ex. 5 | ○ | ⦿ | Ex. 16 | ○ | ⦿ |
| Ex. 6 | ○ | ⦿ | Ex. 17 | ○ | ⦿ |
| Ex. 7 | ○ | Δ | Ex. 18 | ○ | ○ |
| Ex. 8 | ○ | ○ | Ex. 19 | ○ | ⦿ |
| Ex. 9 | ○ | Δ | Ex. 20 | ○ | ⦿ |
| Ex. 10 | ○ | ○ | Ex. 21 | ○ | ○ |
| Ex. 11 | ○ | ⦿ | Ex. 22 | ○ | ⦿ |
| CEx. 1 | X | X | CEx. 4 | Δ | Δ |
| CEx. 2 | Δ | ○ | CEx. 5 | ○ | X |
| CEx. 3 | Δ | Δ |  |  |  |

Ex. = Example, CEx. = Comparative Example

Effect of the Invention

Since the colored resin composition of the present invention is excellent in pigment dispersibility, it is suited for spinning or a film molding. There can be provided a molded article excellent in mechanical and physical properties and color developing properties by using the colored resin composition of the present invention.

Further, there can be provided a coating composition having high pigment dispersibility and high stability by using the colored resin composition of the present invention.

Further, there can be provided a pigment resin composition for recording information which has high pigment color developing properties and high thermal stability by using the colored resin composition of the present invention.

What is claimed is:

1. A process for the production of a colored resin composition, comprising (A) of producing an aqueous slurry of a pigment, (B) of producing a dispersant-containing and solvent-containing melt of a metallocene polyolefin, (C) kneading the aqueous slurry obtained in (A) with the melt obtained in (B) and (D) removing the solvent and the water from the kneaded mixture obtained in (C).

2. The process according to claim 1, wherein a dispersant is incorporated in (A).

3. The process according to claim 1 or 2, wherein the dispersant is a compound of the formula (1), $$C_nH_{2n+1}(OCH_2CH_2)_mOH \quad (1)$$

wherein n is an integer of 1 to 100 and m is an integer of 1 to 100.

4. A flushing method of a pigment, comprising kneading an aqueous slurry of a pigment and a solvent-containing melt of a metallocene polyolefin in the presence of a dispersant which is a compound of the formula (1), $$C_nH_{2n+1}(OCH_2CH_2)_mOH \quad (1)$$

wherein n is an integer of 1 to 100 and m is an integer of 1 to 100.

* * * * *